Aug. 6, 1957 P. K. BORMAN 2,801,803
WASTE DISPOSAL APPARATUS
Filed Nov. 26, 1954 2 Sheets-Sheet 2
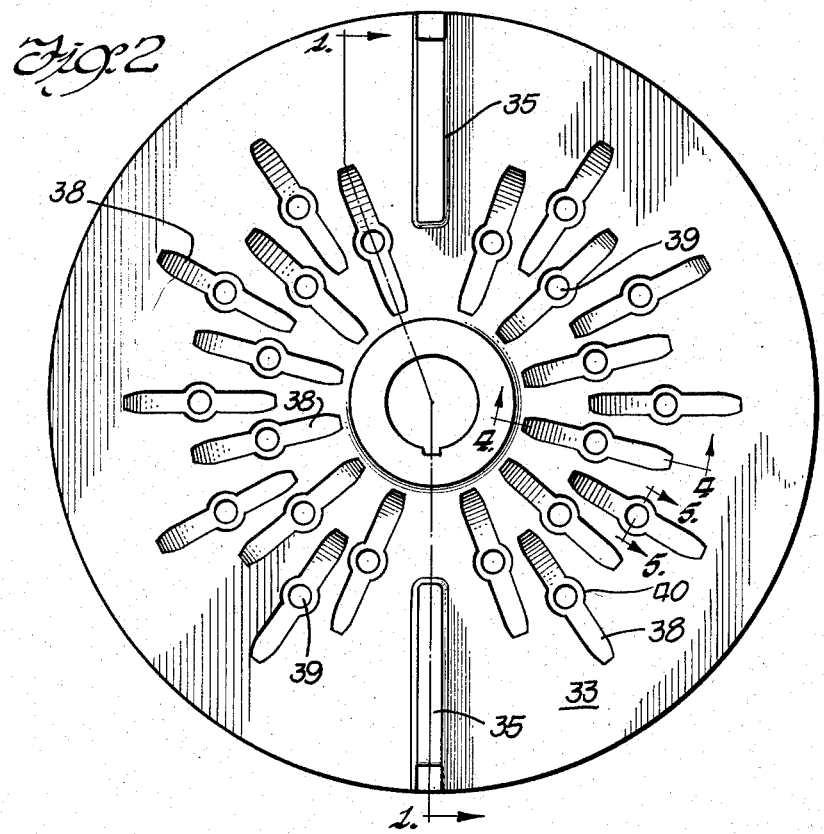
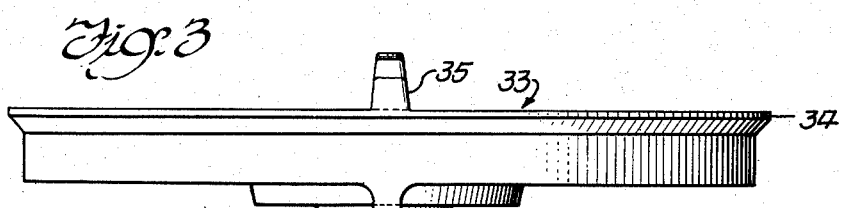
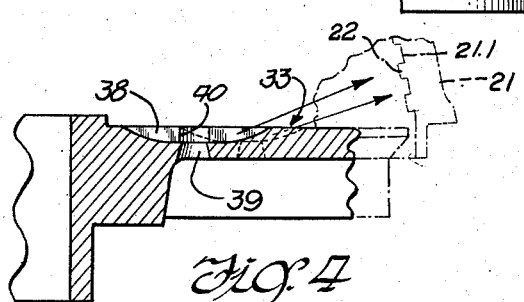
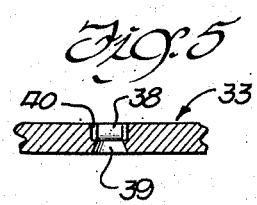
Inventor
Philip K. Borman
Attorney

United States Patent Office 2,801,803
Patented Aug. 6, 1957

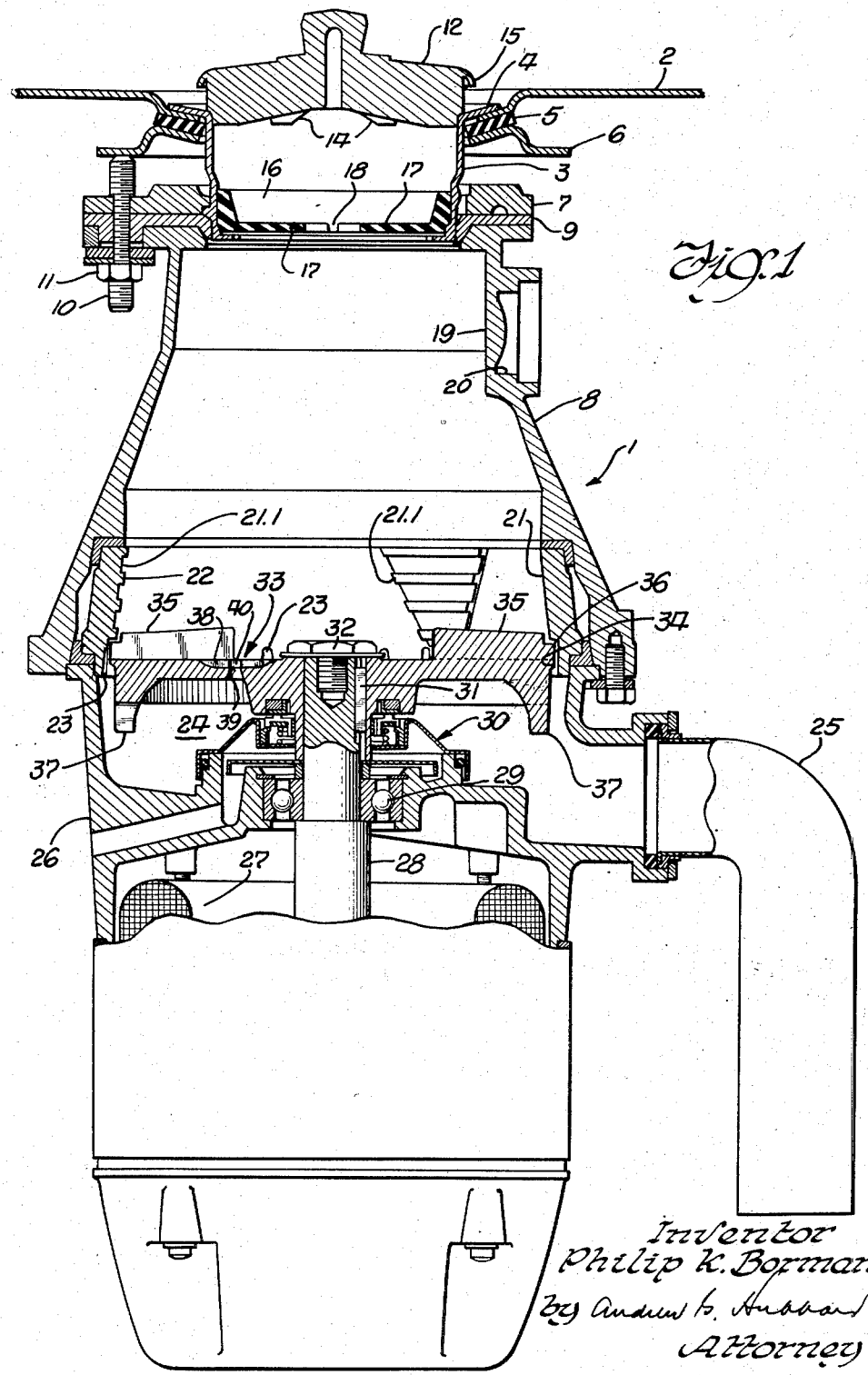

2,801,803

WASTE DISPOSAL APPARATUS

Philip K. Borman, Chicago, Ill., assignor to General Electric Company, a corporation of New York Application November 26, 1954, Serial No. 471,187

6 Claims. (Cl. 241—46)

This invention relates to apparatus for the disposal of waste material, and particularly to apparatus for attachment to a sink drain for receiving a mixture of food waste and water and reducing or comminuting the solid particles of the food waste to produce a flowable mixture suitable for discharge to the sink drain line. In particular, the invention relates to food waste disposal apparatus having improved facilities for accommodating the normal sink drainage which may flow through the apparatus when it is not in use.

A principal object of my invention is to provide, in food waste disposal apparatus of the type in which the waste receiving hopper contains near the base thereof means for comminuting, shredding, and abrading the hard particles of waste material, as said material is agitated and centrifugally impelled by a rapidly rotating flywheel forming the bottom wall of said receptacle, a flywheel construction having drainage apertures which are self-cleaning during each operation of the flywheel.

It is another object of the invention to provide a flywheel or like comminuting element of a food waste disposer having a plurality of drainage passages in communication with which are radially extending drainage grooves having a configuration which facilitates drainage through the disposer when it is not in use and improves the water action within the disposer when the flywheel is rotating during use.

It is a further object of the invention to provide improved comminution means for a food waste disposer or the like.

The presently most popular and successful food waste disposers are of the horizontally rotating impeller or flywheel type in which the periphery of the flywheel has designedly small clearance with respect to a "shredder ring" having various arrangements of edged members against which the food scraps are impelled. Certain of the edged members are arranged to form drainage passages communicating between the comminution chamber and the drainage chamber disposed beneath the flywheel. In order to avoid clogging of said drainage passages by the possible accumulation of a ring of waste material thereabout, and thus insure the normal drainage of sink liquid when the waste disposal apparatus is use, it has been proposed to perforate the central portion of the flywheel to provide supplemental drainage passages communicating between the comminution and drainage chambers. However, flywheel perforations are subject to clogging by waste particles carried thereinto by sink liquids, they may be covered by leafy waste, and the side walls thereof may become encrusted by grease or the like.

The present invention minimizes the possibility of stoppage of the flywheel drainage openings by reducing the depth—that is, the axial dimension—of the openings by forming the flywheel with a plurality of radial grooves which are arcuate when observed in elevation, and from the lowest point of which, considered with respect to the operating face of the flywheel, the axial passages commence. The radial grooves increase the access to the flywheel openings. In addition, the grooves form passages through which liquids travel at such high velocity during operation of the flywheel that accumulations or encrustations on the side walls of the grooves or about the axial openings are swept away. Furthermore, the grooves serrate the flywheel surface and thus contribute to the agitation of solid waste material during flywheel operation. When the flywheel is in rapid rotation, the arcuate shape of the grooves creates a multitude of upwardly and outwardly projected water streams which improve the agitation of the food waste within the chamber and serve to scour side wall portions of the chamber.

In the accompanying drawings:

Fig. 1 is a side sectional elevation of a food waste disposer embodying the invention, with the flywheel in section along lines 1—1 of Fig. 2;

Fig. 2 is a plan view of the flywheel;

Fig. 3 is a side elevation of the flywheel;

Fig. 4 is a fragmentary sectional elevation of the flywheel taken on lines 4—4 of Fig. 2; and Fig. 5 is a fragmentary sectional elevation of the flywheel taken on lines 5—5 of Fig. 2.

Fig. 1 shows in partial side sectional elevation a typical food waste disposer embodying the invention. The disposer 1 is arranged to be suspended from the bottom 2 of a sink bowl or the like. The attachment means is conventional: the inlet collar 3 has a flange 4 which rests upon the sink about the drainage opening thereof. A gasket 5 and clamping ring 6 are fitted about the collar, and there is then applied to the collar a support ring 7. The upper flange or wall of comminution chamber 8 fits beneath the supporting ring (there being the gasket 9 disposed therebetween) and the chamber is secured to the support ring by a suitable plurality of studs 10 which screw through the support ring and engage the clamping ring to drive its gasket 5 tightly against the bottom of the sink bowl. Lock nuts 11 maintain a tight assembly of the associated parts. A stopper 12 is formed with radial legs 14 and is of such configuration that it may be rested on the flange 4 to permit water flow from the sink bowl into chamber 8, or may be set down into the collar 3 so that the rim 15 of the stopper comes into sealing relation with flange 4 when water is to be accumulated in the sink bowl. A removable rubber splash guard 16 has flexible rubber fingers 17 extending radially from a central opening 18. When the chamber 8 is to be loaded with food waste, the stopper 12 is removed and the waste passed through the guard 16, the flexible fingers of which readily yield to accommodate waste pieces which may be larger than the opening 18.

A side wall of the chamber is formed with a knockout 19 at the base of a cylindrical cavity 20. In making installations of food waste disposers and dishwashers in old residences, installation costs may be saved by discharging the dishwasher effluent into the chamber 8, thus utilizing a single plumbing drain for both fixtures. When it is desired to make such a connection, the knockout portion 19 is broken out and the dishwasher drain line (not shown) is fitted into the cavity 20, whereupon by suitable compression fittings or the like (not shown) a fluid-tight connection may be made.

Fixed about the interior of the lower portion of a chamber 8 is a comminution element 21 which is commonly known in the art as a "shredder ring." It comprises a ring-like structure of hardened metal or suitable metal alloy and is formed with, in the embodiment shown, a plurality of inwardly sloping trapezoidal bosses 21.1 which are grooved or otherwise machined to present a plurality of horizontal ridges 22 which form the primary comminuting devices. Usually, there are three such bosses disposed equi-angularly about the shredder ring. The shredder ring is also formed with a substantially larger number of arch-shaped passages 23 which extend from just below the bosses 21.1 through the bottom edge of the shredder ring, as clearly appears in Fig. 1. The passages communicate with a drainage chamber 24, at a low point of which is mounted a tailpiece 25 which connects to a plumbing trap (not shown) as is well known in the art. The drainage chamber comprises a part of a main housing 26 secured to the comminution chamber, as shown. The main housing supports the drive motor 27 of which the shaft 28 is journalled in bearings 29 and extends through the drainage chamber, as shown. A conventional liquid seal assembly 30 is provided about shaft 28.

Fixed to the upper end of shaft 28, as by the key 31 and large headed screw 32, is the flywheel or impeller 33 embodying the present invention. The impeller obviously forms the base of the comminuting chamber and the food waste rests thereon. The rim 34 of the impeller has only slight clearance relative to the shredder ring 21.

The impeller has a plurality, illustratively two, impeller blades 35 which are in diametrical relation and are advantageously an integral part of the impeller casting. As best shown in Fig. 1, the radially outermost portions 36 of the impeller blades sweep below, and in part in front of, the bosses 21.1 with relatively little clearance. The underside of the impeller is provided with diametrically opposed fins 37 which operate as pumping elements to assist in the discharge of the mixture of comminuted waste and water from the discharge chamber.

As best shown in Figs. 2 and 3, impeller 33 is a casting, essentially flat-surfaced except for the impeller blades 35 and the plurality of radially extending grooves 38. Said grooves (see Fig. 4) are concave in elevation and at their lowest point reduce the thickness of the working surface of the impeller by about one-half. At such low point of each of the grooves, the impeller is formed with an aperture 39; the respective apertures slope outwardly in the downward direction and are therefore substantially frusto-conical in shape. A wall slope of 15 degrees from the vertical has been found very satisfactory for the slope of the aperture walls. It will be observed from Figs. 2 and 5 that the side walls of the respective grooves 38 extend arcuately about the apertures 39, and there is thus formed a funnel mouth 40 for each aperture.

To insure the static balance of the impeller, considering that in operation at "no load" it will rotate at about 1750 R. P. M., the grooves and apertures are symmetrically arranged about the impeller. Desirably, the grooves are in a staggered relation and each of the grooves overlaps, so to speak, the immediately adjacent aperture.

The above described impeller construction provides adequate drainage for all normal sink uses and provides amply for drainage of effluent from a dishwasher which may discharge thereinto, as above noted. Even if leafy vegetables were deposited in the hopper without the impeller being subsequently operated to effect comminution and discharge of such vegetables, the multitude of flow passages provided by the grooves and associated apertures provide adequate drainage facilities.

During operation of the disposer, during which time cold water is being run into the comminution chamber in substantial volume from the sink faucet (not shown) centrifugal forces drive the water radially outward where it lubricates the waste material being comminuted at the shredding ring and forcibly flushes the comminuted particles through the passages 23. There is relatively little loss of water through the apertures 39 when the impeller is rotating at its operating speed. The arcuate shape of the grooves 38 contributes to the tumbling of waste particles in the chamber, not only by the roughness imparted to the chamber thereby, but by the upward direction which the grooves impart to the streams of water which are sluicing therethrough during operation of the impeller. The water streams tend to lift and maintain in violent motion the lighter pieces particularly of the food waste being comminuted within the chamber. Additionally, it has been noted that at the end of a disposal operation when the chamber is relatively empty of food waste, the upwardly discharging water streams aid in cleaning the shredder ring. The water streams discharging from the radially outermost grooves forcefully impinge against the lower part of the shredder ring, whereas the discharge through the radially innermost grooves reaches the higher levels of the ring, as suggested by the arrows in Fig. 4.

It has previously been noted that conventional drainage openings through a disposer impeller have been subject to clogging or restriction by accumulations of grease. The water travel across such earlier impellers was essentially sheetlike over the entire area, and insufficient forces were created within the water to effect a scouring action. Pursuant to the present invention, each groove 38 produces a pressure stream which as it sweeps through the groove acts to purge the walls thereof and to clean the funnel entrance 40 of each of the openings 39.

While there has been described what is at present considered to be the preferred embodiment of the invention, it will be understood that various modifications may be made therein, and it is intended to cover in the appended claims all such modifications as fall within the true spirit and scope of the invention.

I claim:

1. A food waste disposer, comprising an upstanding comminution chamber, means for securing said chamber about the drainage opening of a sink or the like for reception of food waste and water, a shredder ring disposed about said chamber at the lower portion thereof, said shredder ring having cutting elements in the wall facing into said chamber and having openings for the passage of comminuted waste and water, drainage means communicating with said chamber, a substantially flat, circular, impeller horizontally disposed in said chamber adjacent the base of said shredder ring to form the floor of said chamber, said impeller being mounted for rotation about a vertical axis concentric with said shredder ring, combined drainage and water deflection means in said impeller, said means comprising a multiplicity of radially extending, narrow, concave grooves formed in the chamber-facing surface of said impeller in a central area thereof intermediate its axis and its periphery, each of said grooves being very much shorter than the radius of said impeller and having a relatively small diameter drainage opening extending axially through said impeller in communication with said drainage means, whereby when said impeller is rotating in the presence of water a portion of said water will flow through said drainage openings, and a portion of said water will flow through said grooves and be deflected upwardly by the arcuate end thereof for mixture with material within said chamber, and means for rotating said impeller at relatively high speed.

2. Food waste disposers according to claim 1, further characterized by said apertures being substantially at the mid-point of said grooves.

3. Food waste disposers according to claim 1, in which said apertures are at the lowest point of said grooves.

4. Food waste disposers according to claim 1, in which side walls of the grooves curve about the apertures in spaced relation with the wall of said apertures.

5. Food waste disposers according to claim 1, in which said grooves are in a plurality of rows about said impeller, said rows being at different radial distances from the axis of rotation of said impeller.

6. A food waste disposer, comprising an upstanding comminution chamber, means for securing said chamber about the drainage opening of a sink or the like to receive food waste and water therefrom, a shredder ring disposed about the base of said comminution chamber, said shredder ring having a substantially cylindrical lower portion formed with a plurality of axially extending passages facing said chamber and having a substantially frusto-conical upper portion provided with a plurality of edged bosses extending into said chamber, a drainage chamber disposed beneath said comminution chamber to receive comminuted waste and liquid therefrom, means for connecting said drainage chamber to a plumbing waste system, a substantially flat impeller disposed at the base of said comminution chamber for rotation in a horizontal plane, the rim of said impeller being in close-clearance relationship with the cylindrical portion of said shredder ring, drainage means comprising apertures in said impeller communicating between said comminution chamber and said drainage chamber, liquid deflection means in said impeller, comprising a multiplicity of narrow grooves formed in the surface thereof facing said comminution chamber, said grooves extending radially and being of much shorter length than the radius of said impeller, said grooves having end portions disposed inwardly of the periphery of said impeller and sloping upwardly in the direction of said shredder ring, whereby liquid flowing into said chamber during rotation of said impeller will be discharged from said grooves in an upward direction toward said shredder ring, and means for rotating said impeller.

References Cited in the file of this patent

UNITED STATES PATENTS

| | | |
|---|---|---|
| 582,873 | Nilsson et al. | May 18, 1897 |
| 2,044,564 | Carter | June 16, 1936 |
| 2,577,152 | Powers | Dec. 4, 1951 |